(12) United States Patent
Takashima (10) Patent No.: US 9,465,727 B2
(45) Date of Patent: Oct. 11, 2016

(54) MEMORY SYSTEM, METHOD FOR CONTROLLING THE SAME, AND INFORMATION PROCESSING DEVICE

(71) Applicant: Sony Computer Entertainment Inc., Tokyo (JP)

(72) Inventor: Shinji Takashima, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 115 days.

(21) Appl. No.: 13/851,307

(22) Filed: Mar. 27, 2013

(65) Prior Publication Data

US 2013/0262786 A1    Oct. 3, 2013

(30) Foreign Application Priority Data

Mar. 30, 2012  (JP) ................................. 2012-082524

(51) Int. Cl.
| | |
|---|---|
| G06F 12/10 | (2016.01) |
| G06F 12/00 | (2006.01) |
| G06F 13/16 | (2006.01) |

(52) U.S. Cl.
CPC ........... *G06F 12/00* (2013.01); *G06F 13/1678* (2013.01); *G06F 12/10* (2013.01); *G06F 2205/067* (2013.01); *Y02B 60/1228* (2013.01)

(58) Field of Classification Search
CPC ...................... G06F 12/0813; G06F 2205/067
See application file for complete search history.

(56) References Cited

U.S. PATENT DOCUMENTS

| | | | |
|---|---|---|---|
| 7,562,271 | B2 | 7/2009 | Shaeffer |
| 8,031,505 | B2 | 10/2011 | Kang |
| 8,756,486 | B2 | 6/2014 | Laberge |

(Continued)

FOREIGN PATENT DOCUMENTS

| | | |
|---|---|---|
| CN | 101635162 A1 | 1/2010 |
| CN | 102177551 A1 | 9/2011 |

(Continued)

OTHER PUBLICATIONS

Office Action for corresponding JP Patent Application No. 2012-082524, pp. 1-9, dated Oct. 6, 2015.

(Continued)

*Primary Examiner* — Duc Doan
(74) *Attorney, Agent, or Firm* — Matthew B. Dernier, Esq.

(57) ABSTRACT

A memory system method for controlling the same, and an information processing device using the same are provided. The system includes a plurality of memory chips electrically connected with one another by a bus (e.g. address bus, data bus, control bus, etc.), which are disposed in a stacked arrangement and extend through the plurality of memory chips in a stacking direction, and a memory controller connected to a plurality of processors and to the bus, and further to a chip select signal line for outputting a chip select signal to each of the plurality of memory chips. The memory controller converts an address signal from each of the processors into a set of the chip select signal and the address signal, which is outputted to the address bus, so as to relay inputs and outputs of data between each of the processors and each of the memory chips.

5 Claims, 10 Drawing Sheets

(56) References Cited

U.S. PATENT DOCUMENTS

| | | | |
|---|---|---|---|
| 8,924,639 B2 | 12/2014 | Ahn | |
| 2006/0218332 A1* | 9/2006 | Boudreau | G06F 13/4018 710/307 |
| 2008/0080261 A1 | 4/2008 | Shaeffer | |
| 2010/0005376 A1 | 1/2010 | Laberge | |
| 2010/0020583 A1 | 1/2010 | Kang | |
| 2010/0077157 A1* | 3/2010 | Gregorius | G06F 13/1605 711/149 |
| 2010/0161886 A1* | 6/2010 | Toelkes et al. | 711/103 |
| 2010/0315887 A1* | 12/2010 | Park | G11C 7/1051 365/189.07 |
| 2011/0145504 A1* | 6/2011 | Anh et al. | 711/129 |
| 2011/0205824 A1* | 8/2011 | Kajigaya | 365/219 |
| 2012/0162836 A1* | 6/2012 | Furuta et al. | 361/56 |

FOREIGN PATENT DOCUMENTS

| | | |
|---|---|---|
| JP | 2004005108 A | 1/2004 |
| JP | 2010524089 A | 7/2010 |
| JP | 2011527064 A | 10/2011 |
| WO | 2008124503 A1 | 10/2008 |
| WO | 2010002561 A2 | 1/2010 |

OTHER PUBLICATIONS

Office Action for corresponding JP Patent Application No. 2012-082524, pp. 1-7, dated Mar. 29, 2016.

Office Action for corresponding CN Patent Application No. 2013101103373, 11 pages, dated Apr. 5, 2016.

* cited by examiner

MEMORY SYSTEM, METHOD FOR CONTROLLING THE SAME, AND INFORMATION PROCESSING DEVICE

CROSS-REFERENCE TO RELATED APPLICATION

The present application claims priority from Japanese application JP2012-082524 filed on Mar. 30, 2012, the content of which is hereby incorporated by reference into this application.

BACKGROUND OF THE INVENTION

1. Field of the Invention

The present invention relates to a memory system, a method for controlling the same, and an information processing device, and in particular, to a memory system accessed by a plurality of processors, a method for controlling the same, and an information processing device using the same.

2. Description of the Related Art

Recently, information processing devices assign particular types of calculations to dedicated processors other than a CPU (Central Processing Unit), such as GPU (Graphics Processing Unit) responsible for image processing and a codec (Coder/Decoder) responsible for data compression and expansion of audio and image data. This way, information processing can be accelerated.

Figure 11:
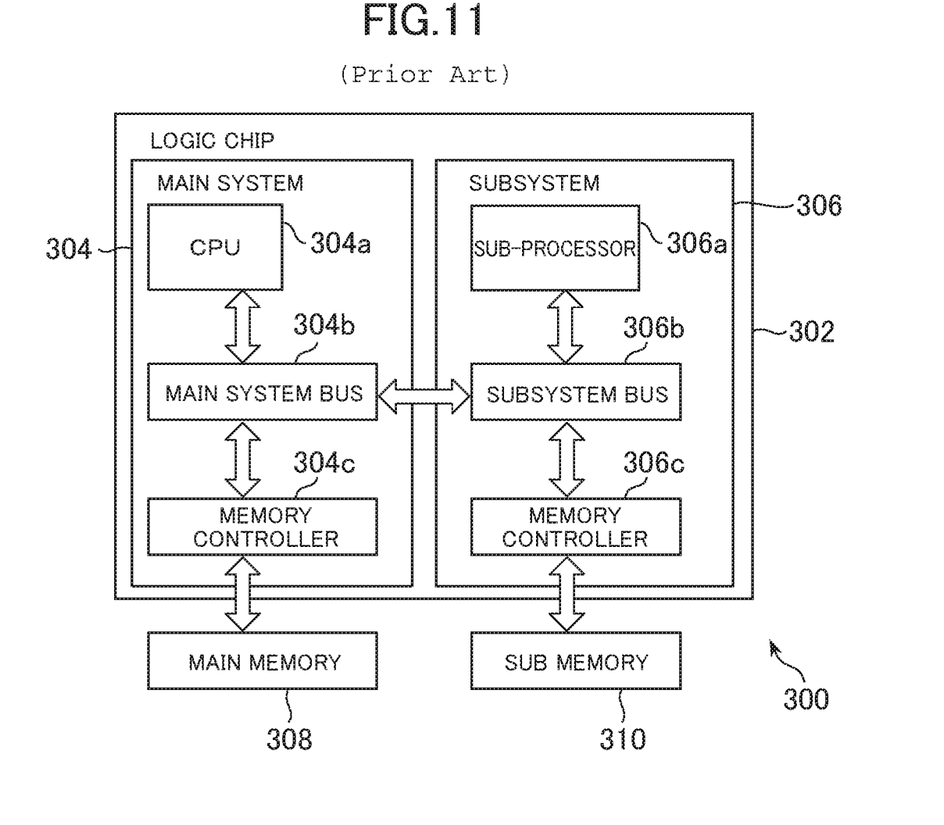
FIG. 11 is a diagram illustrating a circuit structure of a conventional information processing device.

FIG. 11 shows an example of a configuration of a conventional information processing device including such a dedicated processor. As shown in FIG. 11, a conventional information processing device 300 includes a main system 304 configured mainly of a CPU 304a and a subsystem 306 configured mainly of a sub-processor 306a, which is a dedicated processor such as a GPU or a codec. The main system 304 is connected to a main memory 308, and the CPU 304a accesses a main memory 308 via a main system bus 304b and a memory controller 304c. The subsystem 306 is connected to a sub memory 310 dedicated for the subsystem 306, and the sub-processor 306a accesses a sub memory 310 via a subsystem bus 306b and a memory controller 306c. A bus bridge (not shown) is provided between the main system bus 304b and the subsystem bus 306b.

SUMMARY OF THE INVENTION

Typically, the main system 304 can operate at high operating speeds but has a narrow data bus width. On the other hand, the subsystem 306 has a wide data bus width but operates at low operating speeds. Because of this situation, there is typically a significant difference in an operating frequency and a data bus width between the main memory 308 and the sub memory 310. As a result, the conventional information processing device 300 needs several different kinds of memories making it difficult to reduce the component cost. In addition, a wiring between the main system 304 and the main memory 308 and a wiring between the subsystem 306 and the sub memory 310 are respectively required, and this increases the production cost.

One or more embodiments of the present invention have been conceived in view of the above, and an object thereof is to provide a memory system, a method for controlling the same, and an information processing device using the same, capable of reducing costs.

A memory system according to an embodiment of the present invention includes: a plurality of memory chips electrically connected with one another by an address bus, a data bus, and a control bus, which are disposed in a stacked arrangement and extend through the plurality of memory chips in a stacking direction; and a memory controller connected to a plurality of processors and to the address bus, the data bus, and the control bus, and further to a chip select signal line for outputting a chip select signal to each of the plurality of memory chips. The memory controller converts an address signal from each of the processors into a set of the chip select signal and the address signal, which is outputted to the address bus so as to relay inputs and outputs of data between each of the processors and each of the memory chips.

The memory controller may be disposed on the plurality of memory chips.

A width of a data bus of at least one of the plurality of processors may be different from a width of the data bus of the plurality of memory chips. In this case, the memory controller may convert a data signal of the one of the plurality of processors into a data signal having the same width as the data bus of one of the plurality of memory chips.

Each of the plurality of memory chips may be assigned to one of the plurality of processors. In this case, the memory controller may sequentially access each of the plurality of memory chips. Alternatively, the memory controller may access each of the plurality of memory chips in response to an access request from the plurality of processors.

A method for controlling a memory system according to an embodiment of the present invention is a method for controlling a memory system which includes: a plurality of memory chips electrically connected with one another by an address bus, a data bus, and a control bus, which are disposed in a stacked arrangement and extend through the plurality of memory chips in a stacking direction; and a memory controller connected to a plurality of processors and to the address bus, the data bus, and the control bus, and further to a chip select signal line for outputting a chip select signal to each of the plurality of memory chips. The memory controller converts an address signal from each of the processors into a pair of the chip select signal and the address signal, which is outputted to the address bus, so as to relay inputs and outputs of data between each of the processors and each of the memory chips.

An information processing device according to an embodiment of the present invention includes: a plurality of processors; a plurality of memory chips electrically connected with one another by an address bus, a data bus, and a control bus, which are disposed in a stacked arrangement and extend through the plurality of memory chips in a stacking direction; and a memory controller connected to each of the plurality of processors and to the address bus, the data bus, and the control bus, and further to a chip select signal line for outputting a chip select signal to each of the plurality of memory chips. The memory controller converts an address signal from each of the processors into the chip select signal and the address signal, which is outputted to the address bus, so as to relay inputs and outputs of data between each of the processors and each of the memory chips.

DETAILED DESCRIPTION OF THE INVENTION

An embodiment of the present invention will be described below in detail with reference to the accompanying drawings.

Figure 1:
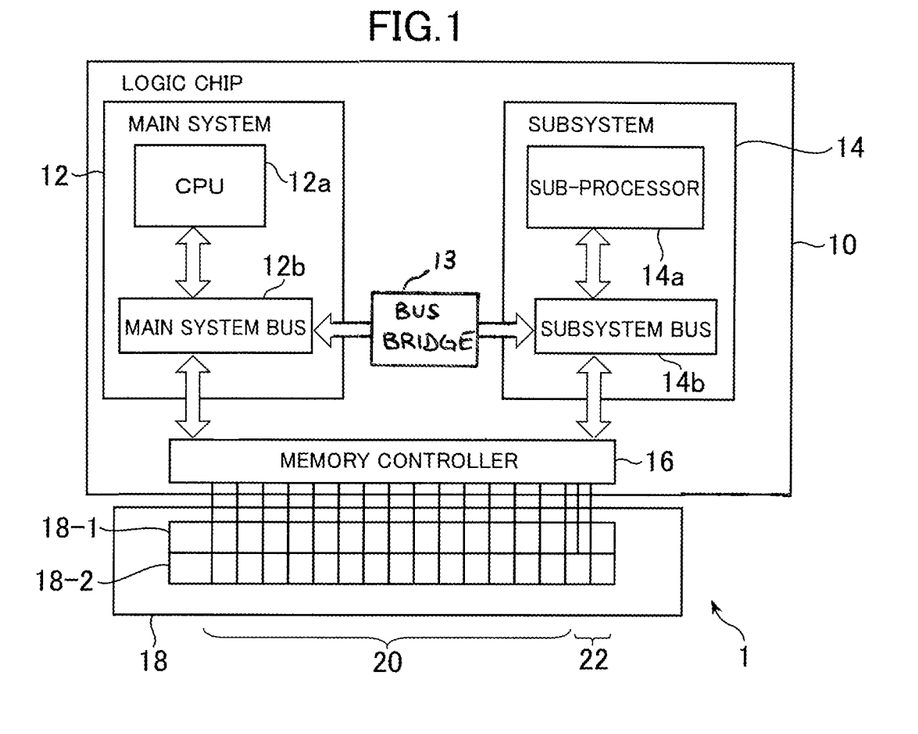
FIG. 1 is a diagram illustrating a circuit structure of the information processing device according to an embodiment of the present invention.

FIG. 1 is a diagram illustrating a circuit structure of the information processing device according to an embodiment of the present invention. As shown in FIG. 1, the information processing device 1 includes a logic chip 10 and a stacked DRAM (Dynamic Random Access Memory) 18. A main system 12 and a subsystem 14 are formed on the logic chip 10. The main system 12 is a general-purpose data operation circuit and includes a main system bus 12b and a CPU 12a connected to the main system bus 12b. The main system bus 12b can, of course, be connected to other circuits, such as a display interface circuit. The subsystem 14 is a data operation circuit for performing a specific type of calculation, and includes a sub-processor 14a and a subsystem bus 14b. The sub-processor 14a is, for example, a GPU or a codec. The CPU 12a and the subsystem 14 may be multi-core processors including a plurality of processor cores.

The stacked DRAM 18 has a plurality of memory chips 18-1 and 18-2 in a stacked arrangement. Each memory chip has many through-silicon vias (TSV). TSVs formed in the same plane on each memory chip connect with each other vertically and electrically, thereby forming a bus 20 including an address bus, a data bus, and a control bus. With this, the memory chips 18-1 and 18-2 are connected in parallel relative to the bus 20. TSV is a three-dimensional mounting technology recently receiving attention for achieving a high speed operation by connecting a plurality of chips with the shortest length of the connections using TSVs formed through a semiconductor substrate.

TSVs are provided in the memory chip 18-1 and the memory chip 18-2 so as to form a chip select signal line 22 for supplying the memory chip 18-2 with a chip select signal. Among these TSVs, the TSVs formed in the memory chip 18-1 are isolated from an internal circuit of the memory chip 18-1, while the TSVs formed in the memory chip 18-2 are connected to an internal circuit of the memory chip 18-2. In this way, the chip select signal can be supplied to the memory chip 18-2 from the surface of the memory chip 18-1. Further, the memory chip 18-1 also has a TSV which forms the chip select signal line 22 for supplying the memory chip 18-1 with a chip select signal. This TSV is connected to the internal circuit of the memory chip 18-1, and can supply the memory chip 18-1 with the chip select signal from the surface of the memory chip 18-1.

The memory chips 18-1 and 18-2 may be preferably high density chips having wide data bus width and operating at relatively low operating speeds, such as DRAM chips in compliance with WIDE I/O. With this, the information processing device 1 can reduce power consumption and is preferably used in, for example, mobile applications.

A memory controller 16 is also formed on the logic chip 10. The memory controller 16 is connected to the main system bus 12b and to the subsystem bus 14b. The memory controller 16 is also connected to the stacked DRAM 18. In particular, there are a great number of bumps formed on a memory-logic chip. These bumps are connected to TSVs on the surface of the memory chip 18-1, thereby connecting the memory controller 16 to the bus 20 and the chip select signal line 22. In this way, the memory controller 16 can relay inputs and outputs of data between the CPU 12a and the stacked DRAM 18, and also relay inputs and outputs of data between the sub-processor 14a and the stacked DRAM 18.

Figure 2:
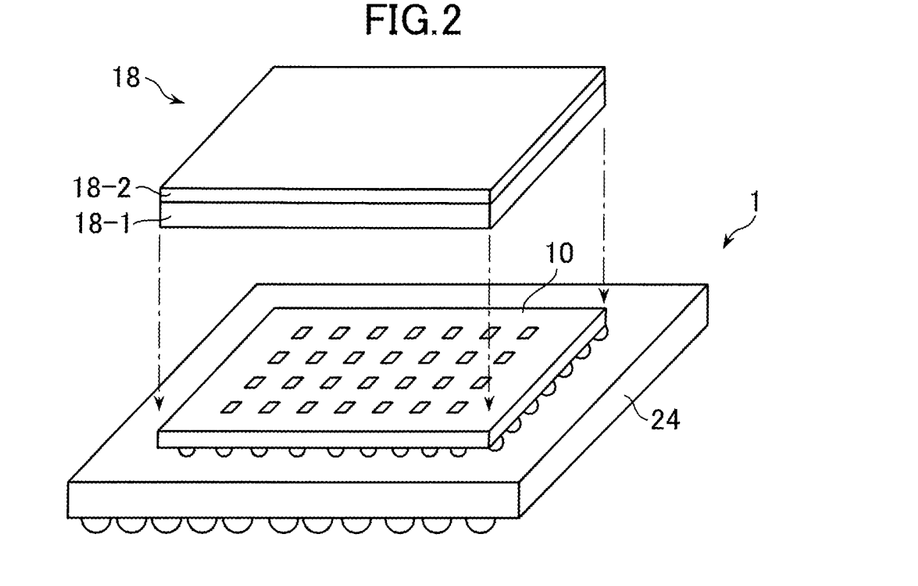
FIG. 2 shows an external perspective view of the information processing device according to an embodiment of the present invention.

FIG. 2 shows an external perspective view of the information processing device according to an embodiment of the present invention. As shown in FIG. 2, a great number of bumps, which are connected to the memory controller 16, are formed on the surface of the logic chip 10. The stacked DRAM 18 is placed on the logic chip 10 with the memory chip 18-1 facing downward, and a group of TSVs and a group of bumps are connected with each other. As a result, the logic chip 10 electrically connects to the stacked DRAM 18. The logic chip 10 is connected to a package interposer 24 in a state where the stacked DRAM 18 is stacked on and connected to the logic chip 10. The package interposer 24 and the logic chip 10 are electrically connected with each other by the bumps. Although not shown here, the logic chip 10 is molded to the stacked DRAM 18 using a resin material. As described above, according to this embodiment, it is possible to electrically connect the stacked DRAM 18, which is prepared for both of the main system 12 and the subsystem 14, to the logic chip 10 by TSVs and bumps without using wire bonding, thereby simplifying the manufacturing process. In addition, the same stacked DRAM 18 is used for the main system 12 and the subsystem 14, and thus the component cost can be easily reduced.

Next, the memory controller 16 will be explained in detail. In the following, when a memory access rate of the main system 12 is 1, a memory access rate of the subsystem 14 is ½. When a data width in memory access of the main system 12 is 1, a data width in memory access of the subsystem 14 is 2. Further, an operation rate of the stacked DRAM 18 is equal to the memory access rate by the main system 12, and a data width of the stacked DRAM 18 is equal to a data width of the subsystem 14. In addition, the memory chip 18-1 is assigned to the main system 12, and the memory chip 18-2 is assigned to the subsystem 14. In other words, only the main system 12 accesses the memory chip 18-1, and only the subsystem 14 accesses the memory chip 18-2. The CPU 12a may of course access the memory chip 18-2 via the main system bus 12b, the subsystem bus 14b, and a bus bridge (not shown). Similarly, the sub-processor 14a may access the memory chip 18-1 via the subsystem bus 14b, the main system bus 12b, and a bus bridge (not shown).

Figure 3:
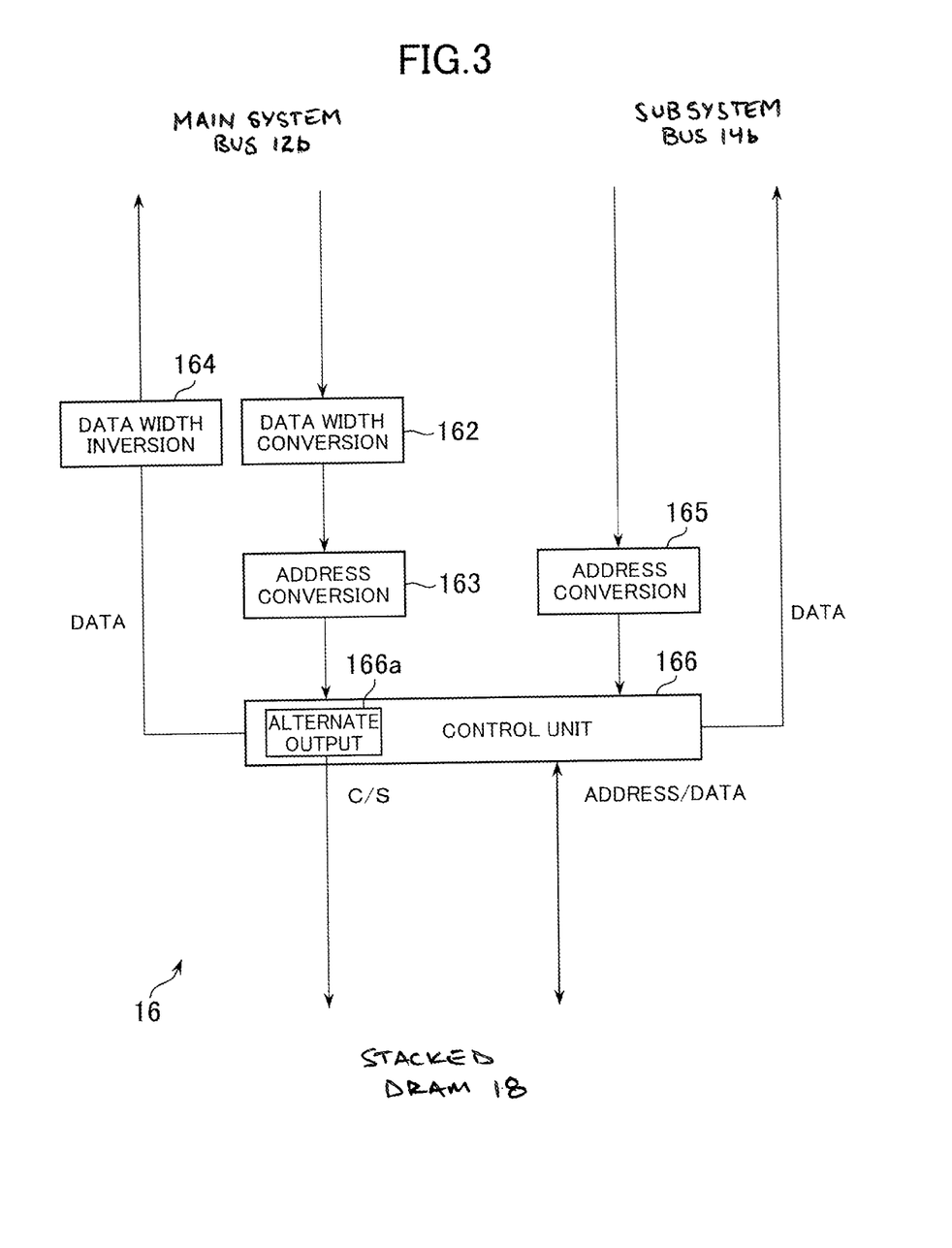
FIG. 3 is a diagram illustrating a first configuration example of a memory controller (when alternately accessing the memory chip)

FIG. 3 is a block diagram illustrating a first configuration example of the memory controller 16. As shown in FIG. 3, the memory controller 16 includes a data width converting unit 162, an address converting units 163 and 165, a data width inverting unit 164, and a control circuit 166. These units are implemented by a logic circuit. The data width converting unit 162 is a circuit which has storage means using a FIFO (First In First Out) approach to sequentially store memory access requests received from the main system bus 12b. The data width converting unit 162 couples two data signals, which are received from the main system bus 12b and to be stored in consecutive addresses, so as to generate a data signal of twice the data width. Here, the memory access requests include an address signal, a data signal (when writing), and a control signal. The address converting unit 163 is a circuit for converting an address signal received from the main system bus 12b into an address signal in an address space of the memory chip 18-1.

The converted address signal includes a channel switching signal, a bank switching signal, a row address signal, and a column address signal. Similarly, the address converting unit 165 is a circuit for converting an address signal received from the subsystem bus 14b into an address signal in an address space of the memory chip 18-2. The converted address signal also includes a channel switching signal, a bank switching signal, a row address signal, and a column address signal. Further, the data width inverting unit 164 is a circuit that partitions data read out from the memory chip 18-1 so as to generate two signals each having half the data width. The output from the circuit is provided to the main system bus 12b.

The control unit 166 is a circuit for providing each of the memory chips 18-1 and 18-2 with an address signal, a data signal (when writing), a control signal, and a chip select signal. In particular, the control unit 166 includes an alternate output circuit 166a for providing each of the memory chips 18-1 and 18-2 of the stacked DRAM 18 with a chip select signal alternately in terms of time. In this way, the control unit 166 can alternately access the memory chips 18-1 and 18-2. When providing the memory chip 18-1 with a chip select signal, the control unit 166 receives, from the address converting unit 163, a memory access request, i.e., an address signal after address conversion, a data signal (when writing) after data width conversion, and a control signal, and provides the memory chip 18-1 with the memory access request via the bus 20. When a read operation is performed, the control unit 166 reads data out from the memory chip 18-1, and provides the data width inverting unit 164 with the data.

Similarly, when providing the memory chip 18-2 with a chip select signal, the control unit 166 receives, from the address converting unit 165, a memory access request, i.e., an address signal after address conversion, a data signal (when writing), and a control signal, and provides the memory chip 18-2 with the memory access request via the bus 20. When a read operation is performed, the control unit 166 reads data out from the memory chip 18-2 and provides the subsystem bus 14b with the data.

In this way, the memory controller 16 converts an address signal from the CPU 12a or the sub-processor 14a into a set comprising the chip select signal and the address signal, thereby relaying inputs and outputs of data between the CPU 12a or the sub-processor 14a and the stacked DRAM 18.

Figure 4:
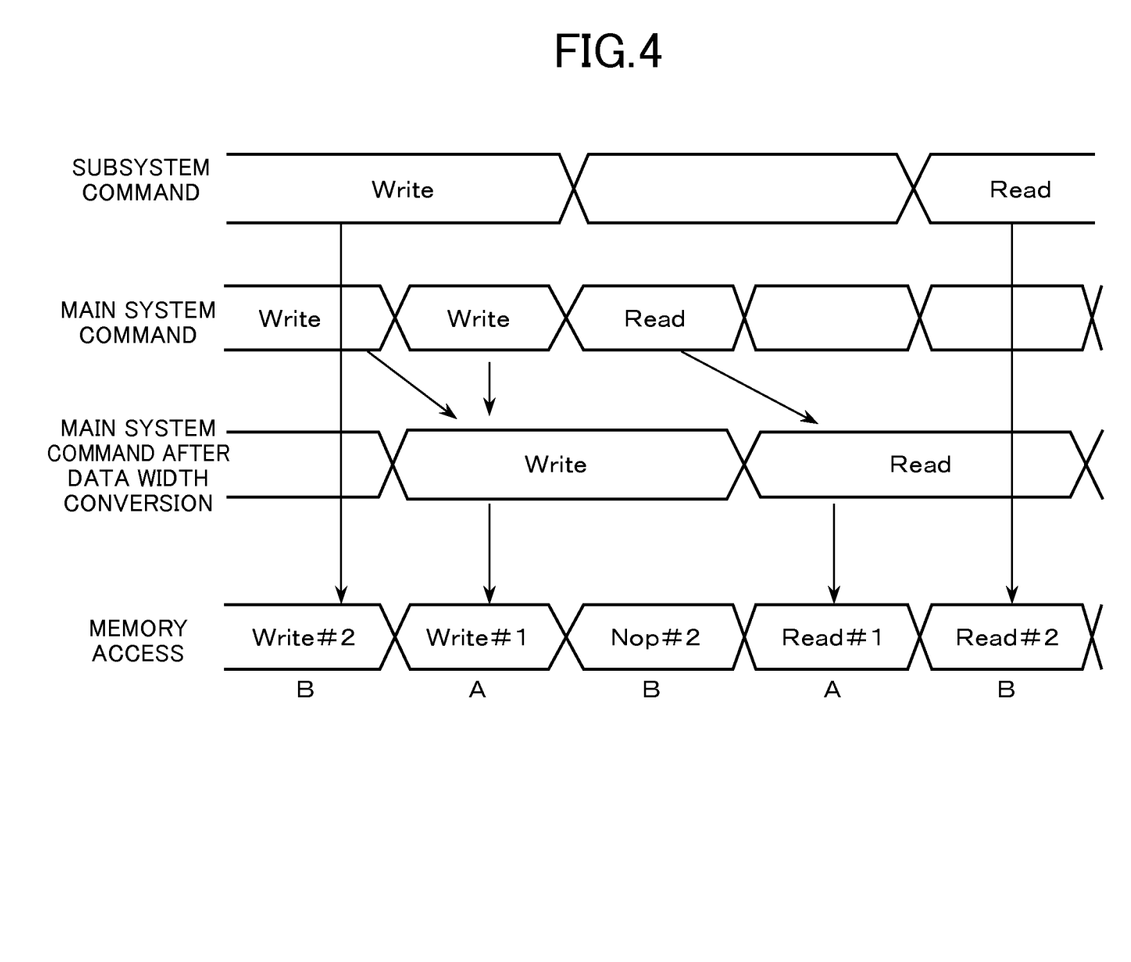
FIG. 4 is a timing diagram illustrating a memory access by the memory controller shown in FIG. 3.

FIG. 4 is a timing diagram illustrating a memory access by the memory controller 16 shown in FIG. 3. In FIG. 4, #1 indicates the memory chip 18-1, and #2 indicates the memory chip 18-2. The top row indicates a memory access request from the subsystem bus 14b, and the second row indicates a memory access request from the main system bus 12b. The third row indicates a memory access request from the data width converting unit 162, and the bottom row indicates a memory access to the stacked DRAM 18.

According to the memory controller 16 shown in FIG. 3, the memory chip 18-1 and the memory chip 18-2 are accessed alternately. As shown in the bottom row of FIG. 4, if the access period to the stacked DRAM 18 is presented in, for ease of explanation, a memory access period A and a memory access period B alternately in terms of time, access to the memory chip 18-1 is only performed during the memory access period A, and an access to the memory chip 18-2 is only performed during the memory access period B. During the access period A to the memory chip 18-1, the memory access is performed using the signal (converted data signal and converted address signal) that had been already obtained by the start of the access period A. Similarly, during the access period B to the memory chip 18-2, the memory access is performed using the signal (data signal and converted address signal) that had been already obtained by the start of the access period B. According to the first configuration example, both of the main system 12 and the subsystem 14 are guaranteed access opportunities.

Figure 5:
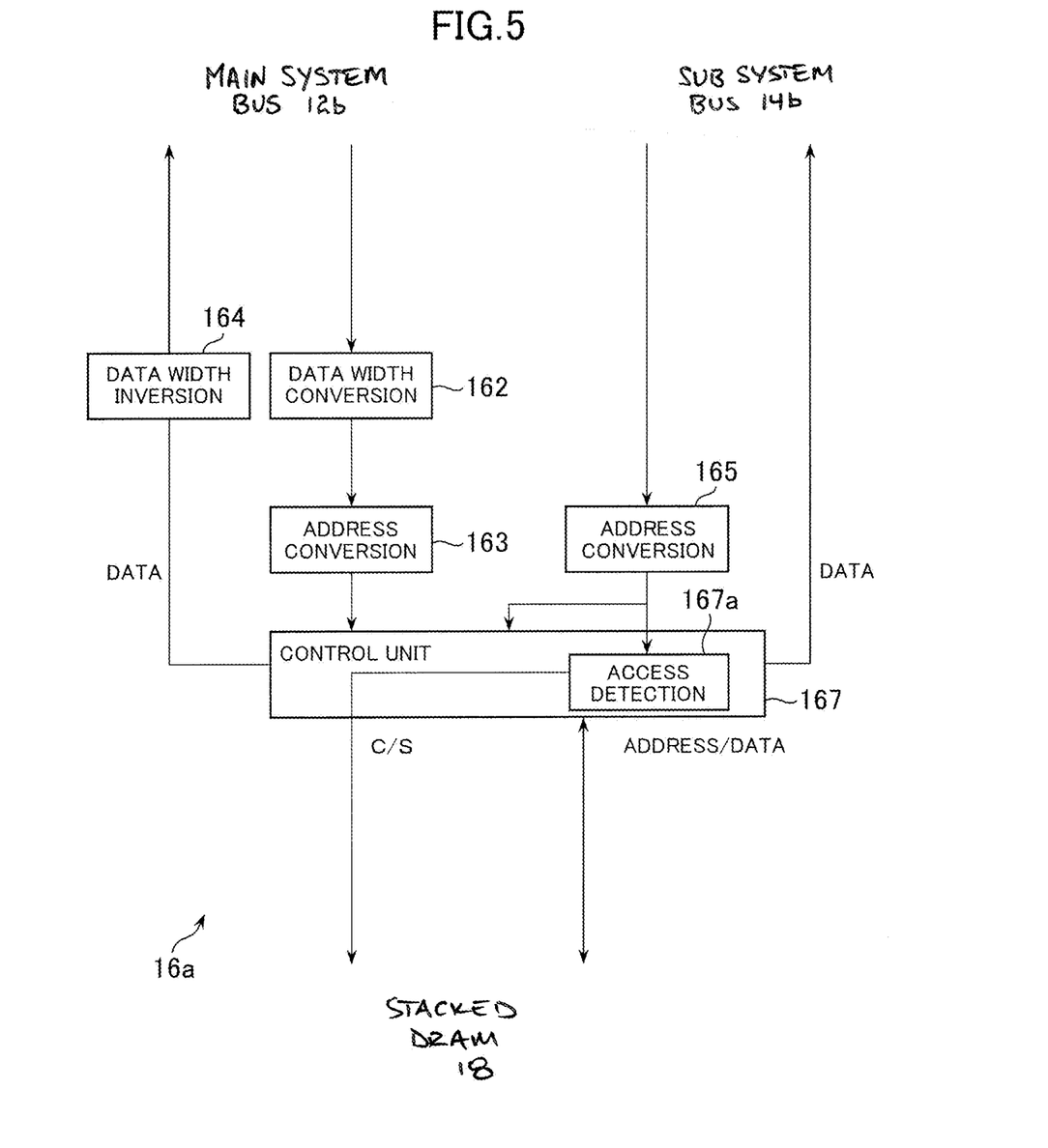
FIG. 5 is a block diagram illustrating a second configuration example (when preferentially accessed by the subsystem)

FIG. 5 is a block diagram illustrating a second configuration example of the memory controller. The memory controller 16a shown in FIG. 5 is different from the memory controller 16 shown in FIG. 3 in that a control unit 167 is provided with an access detecting unit 167a connected to the address converting unit 165. The access detecting unit 167a has a function to output a chip select signal. Basically, the access detecting unit 167a outputs a chip select signal for selecting the memory chip 18-1 during the access period A, and outputs a chip select signal for selecting the memory chip 18-2 during the access period B. In this regard, the access detecting unit 167a monitors whether or not the address converting unit 165 outputs an access request, and, if the address converting unit 165 has not output an access request by the start of the access period B, also outputs a chip select signal for selecting the memory chip 18-1 during the access period B.

Figure 6:
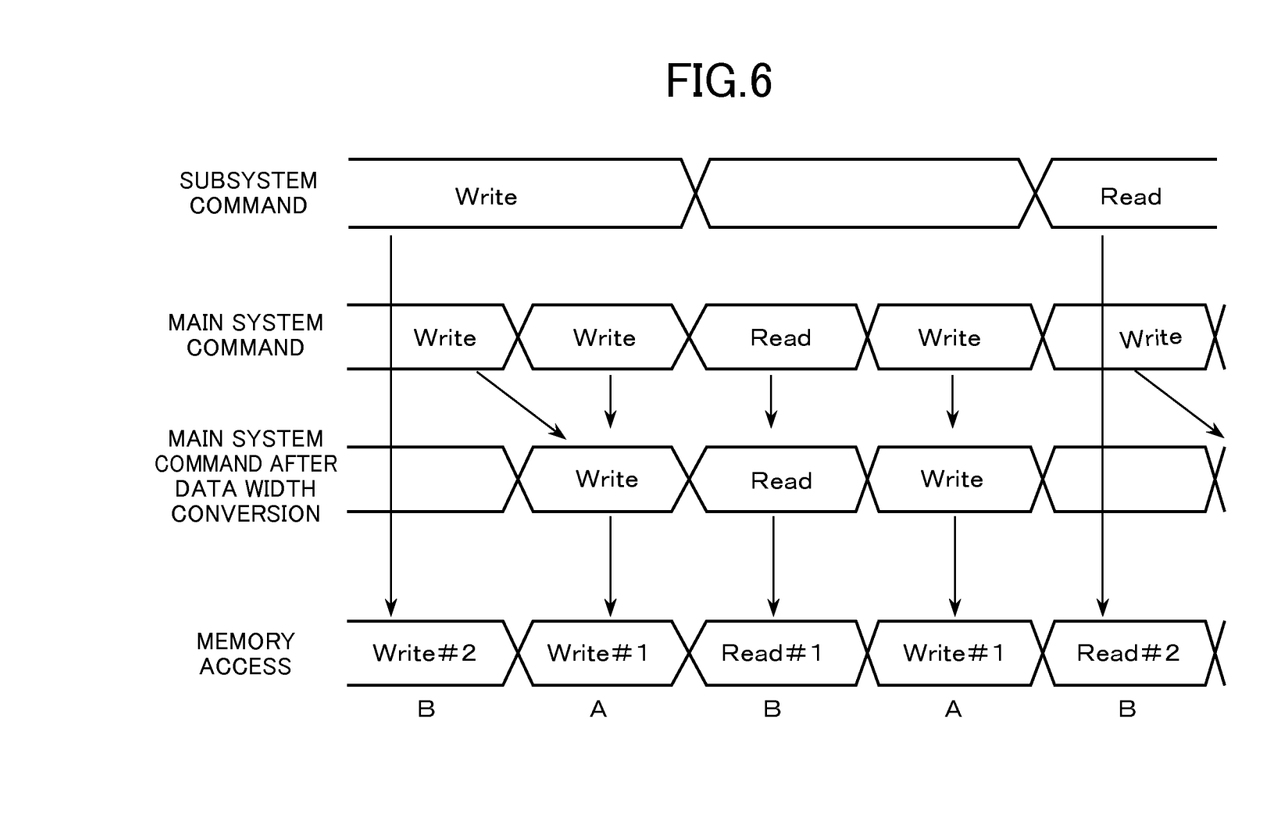
FIG. 6 is a timing diagram illustrating a memory access by the memory controller shown in FIG. 5.

FIG. 6 is a timing diagram illustrating a memory access by the memory controller 16a shown in FIG. 5. With the memory controller 16a shown in FIG. 6, only an access from the main system 12 to the memory chip 18-1 is performed during the access period A. On the other hand, during the access period B, an access from the subsystem 14 to the memory chip 18-2 is basically performed. However, if there is no access request from the subsystem 14, an access from the main system 12 to the memory chip 18-1 is performed. In other words, the access period A is used only for processing of an access request from the main system 12, and the access period B is used for processing of both an access request from the main system 12 and an access request from the subsystem 14. When an access to the memory chip 18-1 is performed during the access period B, data width conversion by the data width converting unit 162 is not performed, and only the access request already received is provided to the memory chip 18-1. According to the second configuration example, when there is no access request from the subsystem 14, the access request from the main system 12 can be processed. As a result, efficiency of a memory access can be improved.

Figure 7:
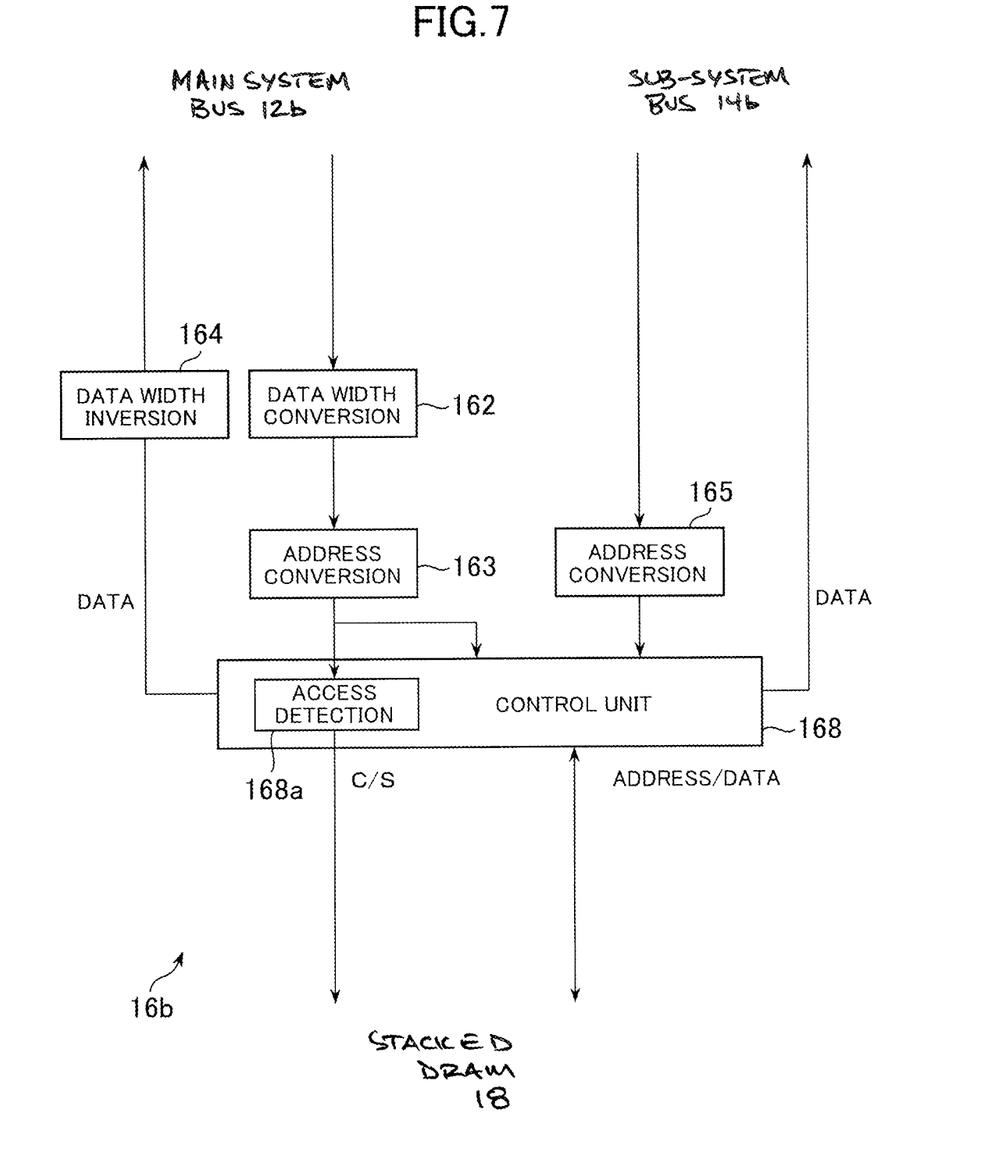
FIG. 7 is a block diagram illustrating a third configuration example of the memory controller (in a case where the subsystem uses a period during which an access is not performed by the main system)

FIG. 7 is a block diagram illustrating a third configuration example of the memory controller. The memory controller 16b shown in FIG. 7 is different from the memory controller 16 shown in FIG. 5 in that a control unit 168 is provided with an access detecting unit 168a connected to the address converting unit 163. The access detecting unit 168a has a function to output a chip select signal. Basically, the access detecting unit 168a outputs a chip select signal for selecting the memory chip 18-1 during the access period A, and outputs a chip select signal for selecting the memory chip 18-2 during the access period B. In this regard, the access detecting unit 168a monitors whether or not the address converting unit 163 outputs an access request, and, if the address converting unit 163 has not output an access request by the start of the access period A, also outputs a chip select signal for selecting the memory chip 18-2 during the access period A. Here, a memory access rate of the subsystem 14 of the third configuration example is twice as fast as that of the second configuration example. That is, when a memory access rate by the main system 12 is 1, a memory access rate of the subsystem 14 is also 1.

Figure 8:
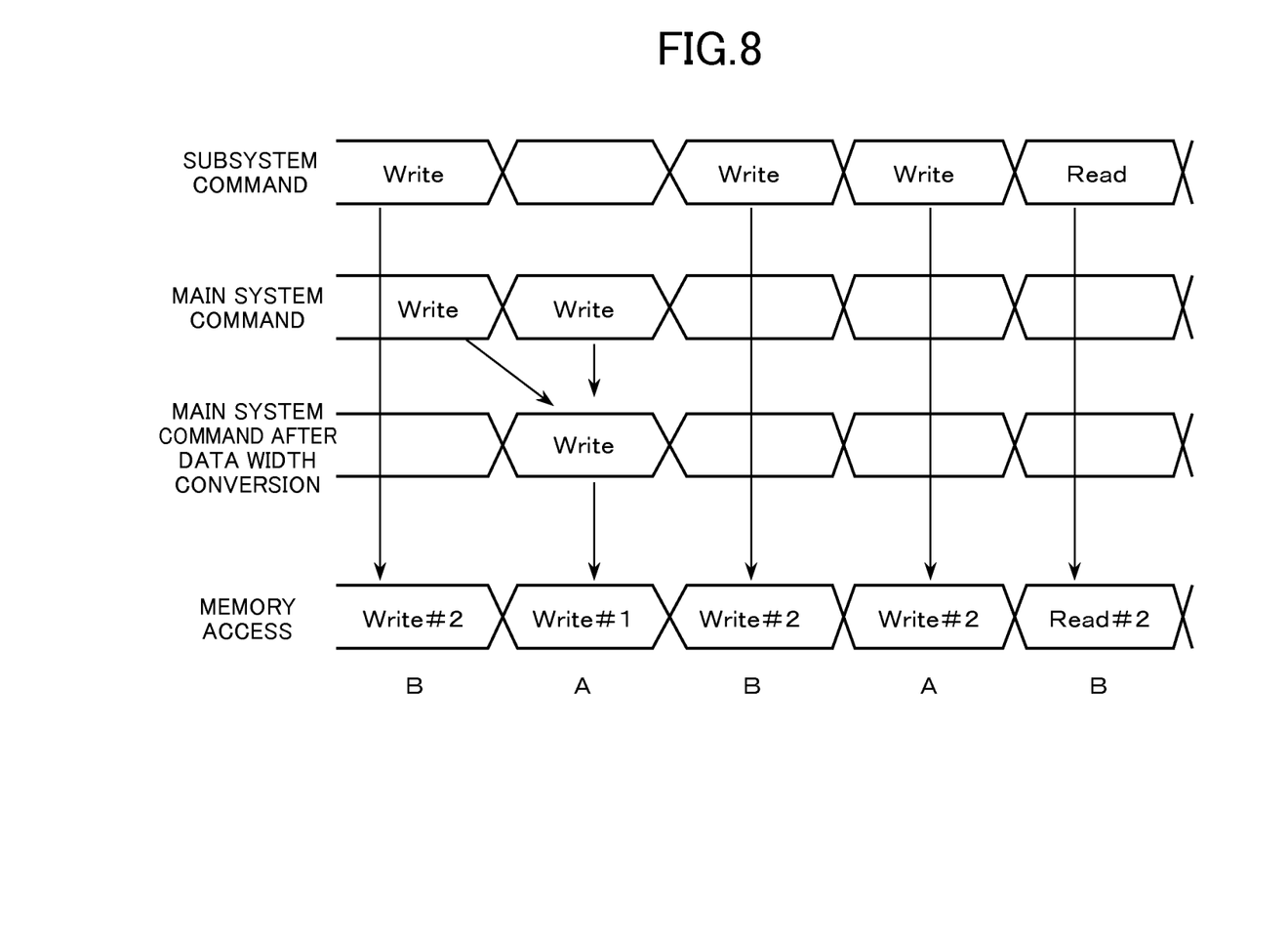
FIG. 8 is a block diagram illustrating a fourth configuration example of the memory controller (in a case where one of the systems uses a period that is not used by the other system)

FIG. 8 is a timing diagram illustrating a memory access by the memory controller 16b shown in FIG. 7. With the memory controller 16b shown in FIG. 8, only an access from the subsystem 14 to the memory chip 18-2 is performed during the access period B. On the other hand, during the access period A, an access from the main system 12 to the memory chip 18-1 is basically performed. However, if there is no access request from the main system 12, an access from the subsystem 14 to the memory chip 18-2 is performed. In other words, the access period B is used only for processing of an access request from the subsystem 14, and the access period A is used for processing of both an access request from the main system 12 and an access request from the subsystem 14. According to the third configuration example, when there is no access request from the main system 12, the access request from the subsystem 14 can be processed, and thus operation speeds of the subsystem 14 can be improved.

Figure 9:
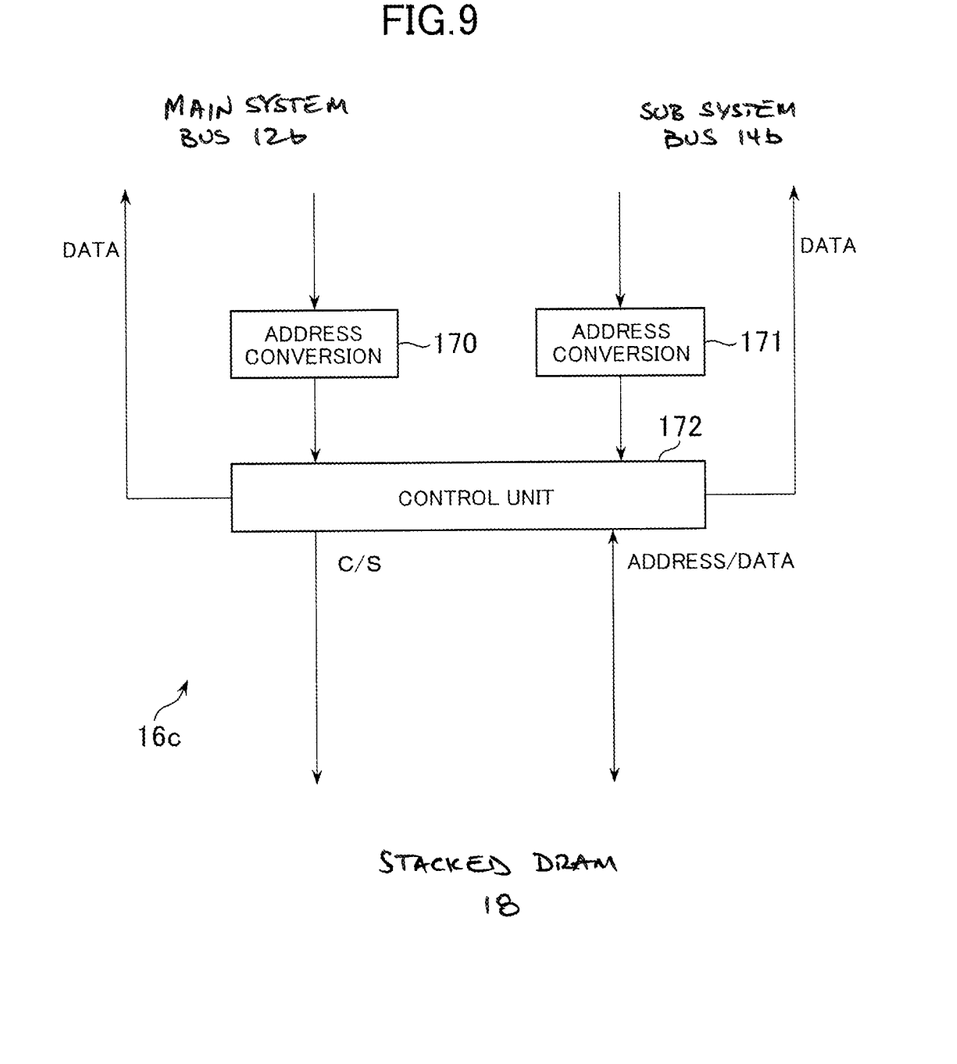
FIG. 9 is a block diagram illustrating a fourth configuration example of the memory controller for maximizing memory performance.
Figure 10:
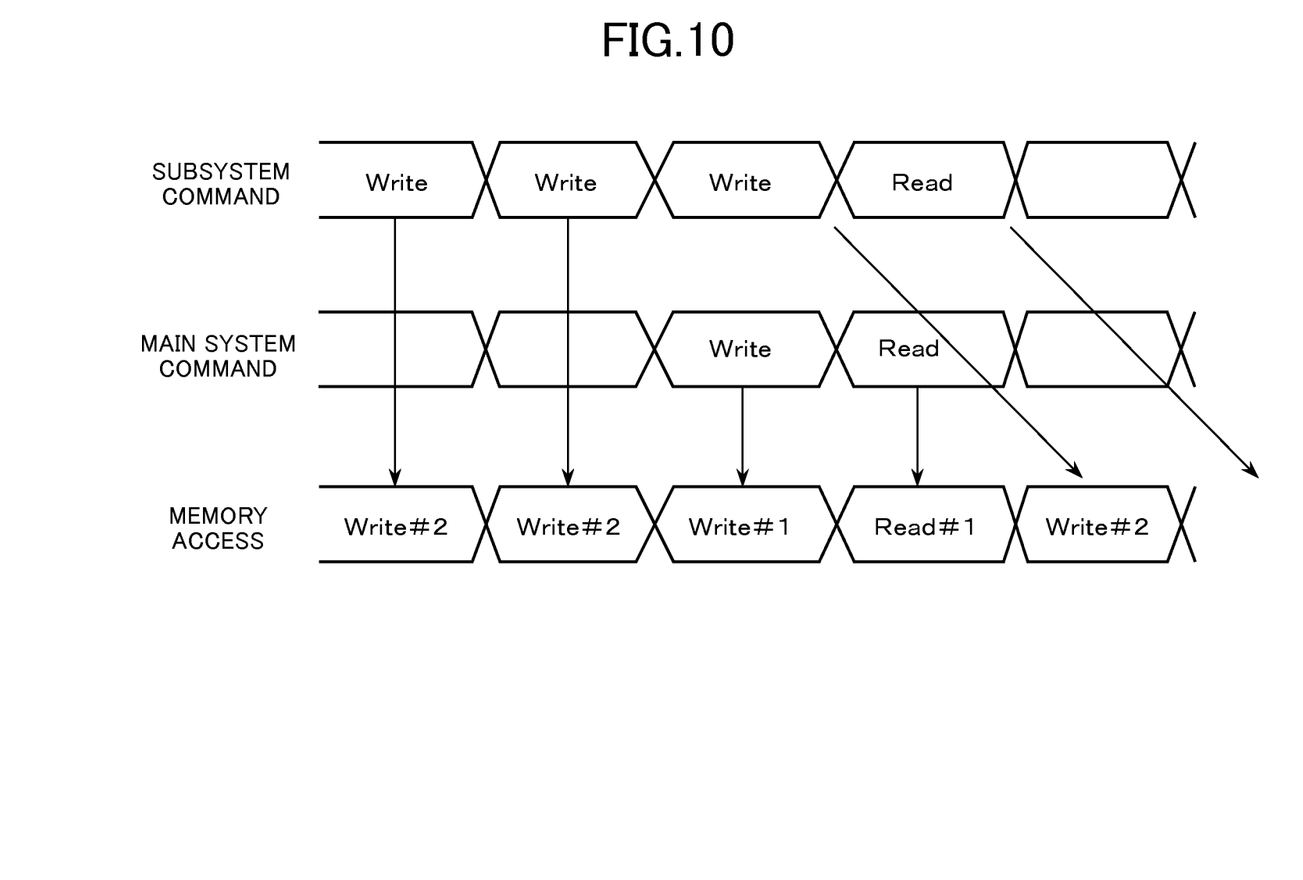
FIG. 10 is a timing diagram illustrating a memory access by the memory controller shown in FIG. 9.

FIG. 9 is a block diagram illustrating a fourth configuration example of a main controller. FIG. 10 is a timing diagram illustrating the operation of the main controller. Here, when a memory access rate by the main system 12 is 1, a memory access rate by the subsystem 14 is also 1. Further, when a data width at the time of the memory access by the main system 12 is 1, a data width at the time of the memory access by the subsystem 14 is also 1. In addition, an operation rate of the stacked DRAM 18 is equal to the memory access rate by the main system 12, and a data width of the stacked DRAM 18 is also equal to a data width of the main system 12.

The memory controller 16c shown in FIG. 9 includes an address converting units 170 and 171 and a control unit 172. The address converting unit 170 is a circuit for converting an address signal received from the main system bus 12b into an address signal in an address space of the memory chip 18-1. The converted address signal includes a channel switching signal, a bank switching signal, a row address signal, and a column address signal.

Similarly, the address converting unit 171 is a circuit for converting an address signal received from the subsystem bus 14b into an address signal in an address space of the memory chip 18-2. The converted address signal also includes a channel switching signal, a bank switching signal, a row address signal, and a column address signal. The control unit 172 sequentially provides the stacked DRAM 18 with the access requests sequentially received from the address converting unit 170 and the access requests sequentially received from the address converting unit 171 based on predetermined rules.

For example, the control unit 172 may employ so-called round-robin processing for simplicity, and provide the stacked DRAM 18 with the access request from the address converting unit 170 and the access request from the address converting unit 171 alternately. If the control unit 172 does not receive an access request from one of the address converting units 170 and 171, it may provide the stacked DRAM 18 with an access request from the other units. The control unit 172 may incorporate a FIFO buffer for sequentially storing access requests from the address converting unit 170 and a FIFO buffer for sequentially storing access requests from the address converting unit 171. Based on the number of access requests stored in each buffer, the control unit 172 may assign priority to each of the main system 12 and the subsystem 14 in real-time. Then, according to the assigned priorities, the control unit 172 may provide the stacked DRAM 18 with the access requests stored in each of the buffers.

Specifically, the greater the number of stored access requests in a buffer, the higher the priority assigned to the main system 12 or the subsystem 14 corresponding to the buffer, and the control unit 172 may provide the stacked DRAM 18 with the access requests from the systems in descending order of priorities associated with the systems. Further, the control unit 172 may provide the stacked DRAM 18 with the access requests according to various rules. In a case where an access request from the main system 12 is provided to the stacked DRAM 18, the memory controller 172 outputs a chip select signal for selecting the memory chip 18-1. Further, in a case where an access request from the subsystem 14 is provided to the stacked DRAM 18, the memory controller 172 outputs a chip select signal for selecting the memory chip 18-2. According to the fourth configuration example, maximum efficiency of accesses to the stacked DRAM 18 can be facilitated.

According to the information processing device 1 described above, the main system 12 and the subsystem 14 use the same stacked DRAM 18, and thus the component cost can be easily reduced. In addition, a wiring between the logic chip 10 and the stacked DRAM 18 is mainly formed by the TSVs, and thus the wiring can be simplified and the production cost can be reduced.

The present invention is not limited to the above embodiment, and can be variously modified. For example, the information processing device of the present invention may implement some of the first to fourth examples. In this case, an operation according to one of the examples may be performed based on a mode set by a user. This enables to provide the user with various memory accesses according to the needs of the user.

What is claimed is:

1. A system, comprising:
   a first processor having a first data bus width and a first memory access rate;
   a second processor having a second data bus width, which is substantially wider as compared to the first data bus width of the first processor, and having a second memory access rate, which is substantially lower as compared to the first memory access rate of the first processor;

a single direct random access memory unit (DRAM) comprising a plurality of memory chips electrically connected with one another by an address bus, a data bus, and a control bus, which are disposed in a stacked arrangement and extend through the plurality of memory chips in a stacking direction, where the data bus of the plurality of memory chips has a third data bus width, which is substantially wider as compared to the first data bus width of the first processor, and has a third memory access rate, which is substantially higher as compared to the second memory access rate of the second processor; and a single memory controller connected to the first and second processors and to the address bus, the data bus, and the control bus, and further to a plurality of chip select enable signal lines for outputting a respective chip select enable signal to each of the plurality of memory chips, wherein:

the single memory controller receives memory access requests from each of the first and second processors and converts an address signal within a given memory access request into a set comprising one or more of the chip select enable signals and the address signal, which is outputted to the address bus, so as to relay inputs and outputs of data between each of the first and second processors and one or more of the memory chips, the single memory controller: (i) converts data flowing from the first processor to the DRAM into a modified, wider data signal having a width equal to the third data bus width of the data bus of the plurality of memory chips; (ii) converts data flowing from the DRAM to the first processor into a modified, narrower data signal having a width equal to the first data bus width of the first data bus of the first processor; (iii) does not convert data flowing from the second processor to the DRAM; and (iv) does not convert data flowing from the DRAM to the second processor, and the single memory controller: (i) stores a first backlog of memory access requests received from the first processor; (ii) stores a second backlog of memory access requests received from the second processor; and (iii) services the first backlog of memory access requests or the second backlog of memory access requests on a priority basis depending on which backlog is of a greater number.

2. The memory system according to claim 1, wherein the single memory controller is disposed within a logic chip, and the logic chip is disposed in a stacked relationship with the plurality of memory chips.

3. The memory system according to claim 1, wherein at least one of the plurality of memory chips is assigned to the first processor, and at least one of the plurality of memory chips is assigned to the second.

4. The memory system according to claim 3, wherein the single memory controller sequentially accesses each of the plurality of memory chips.

5. The memory system according to claim 3, wherein the single memory controller accesses respective ones of the plurality of memory chips in response to respective access requests from the first and second processors.

* * * * *